UNITED STATES PATENT OFFICE.

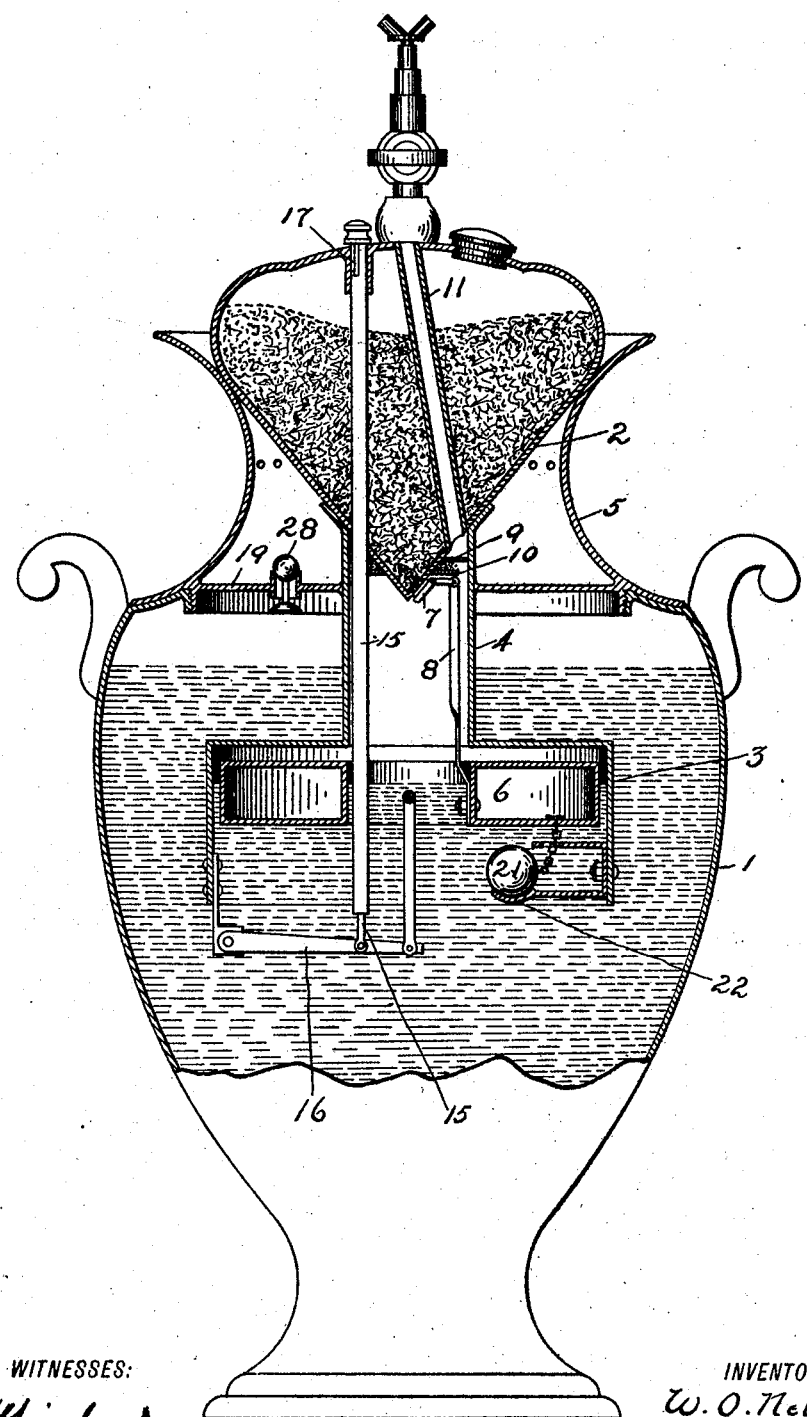

WILLIAM OTTERBEIN NELSON, OF BALTIMORE, MARYLAND, ASSIGNOR OF ONE-TENTH TO CHARLES SELDEN, OF BALTIMORE, MARYLAND.

ACETYLENE-GAS-GENERATOR LAMP.

No. 805,986.      Specification of Letters Patent.      Patented Nov. 28, 1905.

Application filed October 9, 1902. Serial No. 126,393.

*To all whom it may concern:*

Be it known that I, WILLIAM OTTERBEIN NELSON, a citizen of the United States, and a resident of Baltimore, in the State of Maryland, have invented certain new and useful Improvements in Acetylene-Gas Lamps and Generators, of which the following is a specification.

My invention relates to acetylene-gas generators, and more particularly to acetylene-gas generators as combined with and forming a part of a table-lamp.

The main object of my invention is to secure compactness, facility for cleaning, quickness and delicacy of regulation in the feed of the carbid, freedom from danger in the use of the apparatus, and other advantages which will be apparent from the following description, taken in connection with the accompanying drawing.

My invention consists in the combination of devices and details of construction more particularly specified in the claims.

Among other details my invention comprises means for locking the generator out of action, means for automatically closing the carbid-feed valve in case the lamp is overturned, an improved construction providing a filter for filtering the gas, and an organization of the parts such that all the operative portions of the lamp may be withdrawn as a unitary structure from the font, leaving the same free from obstruction, so that it may be readily cleaned.

The accompanying drawing is a vertical central section through a lamp equipped with a generator constructed in accordance with my invention.

1 is a font or tank adapted to contain the liquid, such as water, used in generating the gas, and 2 is the carbid-chamber, made, preferably, as shown, in conical form, with its apex pointing downwardly to facilitate the feed of the material.

3 is the gas-generating chamber proper, sustained centrally in the font 1 and communicating with the carbid-chamber through the cylinder or tunnel 4, which connects the chamber 2 and gas-bell 3 to make practically one structure.

In the gas-generating chamber 3 is a float 6, sustained upon the liquid contained in said chamber in the form of my invention herein illustrated and in such manner that when the pressure of gas accumulated in said chamber falls the level of the column sustaining the float will rise and will by means of the rod or connection 8, passing up through the tunnel 4, operate on the feed device 7 to permit the feed of the material from the chamber 2 through the tunnel 4 into the liquid.

The liquid-holding capacity of the gas-generator chamber 3, as compared with the font when filled with liquid to the point indicated, is such that a very small change of level in the liquid in the font will accompany a large change of level of liquid in the gas-generator, so that a quicker and finer action of the carbid-feed valve will be secured in response to any changes of gas-pressure in the generator and consequent change of the level of the liquid therein and resulting fall of the float sustained on said liquid.

It is preferred to construct the float 6 in the form of a ring, as shown, so as to afford a free space at its center in line with the tunnel 4, into which the material may drop from the carbid-chamber.

5 is the neck of the lamp in which the carbid-chamber and attached parts are secured, and the neck 5 is separable from the body or font 1, so that the generators and attachments constituting the generator and burner may be removed together through an opening in the top of the font of sufficient size to permit the passage of the gas bell or generator 3.

Within the neck 5 is the diaphragm 19, secured thereto or made a part thereof and having a downwardly-extending flange which fits into the opening in the top of the font and is, if desired, suitably screw-threaded, as shown. To this diaphragm is attached the funnel 4, carrying the gas bell or generator 3. The lower end of the neck flares outwardly from the point of connection of the diaphragm 19 and rests upon the top of the font around the opening.

The tunnel 4 is made as small as possible consistent with the free and unobstructed passage of the carbid through it in order to allow as much space for water as possible in the exterior liquid column whose pressure counteracts the pressure of gas on the column supporting the float, and so that the rise of the liquid-level in the outside column may be slight for any given fall in the inside column produced by any increase of the gas-pressure. By this means a large amplitude of movement of the float is secured for small variations of pressure in the generator-chamber, thereby insuring a quick and positive action of the feed-regulating valve or gate.

The feed-valve, which may be of any desired construction, is shown as a swinging gate 7, provided with a horizontal arm extending from the hinge of the valve, and the length of which is made shorter than the length from the hinged center of the valve to the end thereof near the apex or lower end of the opening in the carbid-chamber. The horizontal arm aforesaid is connected by a rod 8 with the float, as shown. By this means a small movement of the float will cause a comparatively large movement of the valve, the comparative amplified movement being determined by the length of the arm.

As will be seen, the generator chamber or bell is practically submerged in the liquid, so that the gas generated may be cooled by coming in contact with the inner surfaces, whereby the moisture in it will be condensed and it will be freed from other impurities.

To provide a filtering device, rings 9 10 may be fixed in the upper end of the tunnel 4 and preferably above the apex of the carbid-chamber. The ring 9 is made of thin metal and perforated with numerous holes and should fill the annular space between the outside of the carbid-chamber and the inside of the tunnel. The lower ring 10 serves to support the filtering material in the space between said rings 9 and 10. Said ring 10 may be attached directly to the carbid-chamber and may be made of smaller diameter than ring 9, so as to leave a space around its outer edge sufficiently wide to admit the insertion of the filtering material or the removal of it should that become necessary.

The tube 11 leads from the space above the filter to the burner. The gas passes from the gas-space in the generator through the filter and is freed from any dust or foreign matter. Since the gas may circulate freely through the spaces left above the filter before entering the tube 11, any moisture that remains in it will be condensed, so that it will be delivered to the burner in a very pure condition, and clogging of the burner is not liable to occur.

To lock the generator out of action when desired—as, for instance, when it is being filled—I provide an attachment to the float and valve whereby the same may be manipulated from without and held in position to keep the valve closed. For this purpose the rod 15, extending from the top of the apparatus down through the carbid-chamber, the tunnel, and the gas-bell, may be provided. Said rod 15 connects to the lever 16, hinged on the gas-bell and in turn connected with the float 6.

The rod 15 may be provided at its upper end with a bayonet-joint catch, as shown at 17, so that when the rod is depressed to lower the float and close the valve 7 it may be locked or held down in position by turning the rod 17 to cause the pin to engage the shoulder in the bayonet-joint formed in the tube through which it passes.

By depressing and locking the parts carbid will be prevented from escaping when the carbid-chamber and connected generator are lifted out of the font.

28 is an automatic valve seated in an aperture in the diaphragm or plate 19, which closes the mouth or upper end of the font, and which diaphragm is preferably secured to the parts constituting the generator portion of the apparatus. The diaphragm 19 is fastened to the tunnel 4 and also, if desired, to the neck 5. Air enters the space at the upper portion of the font freely through the aperture while the apparatus is in operation; but should the lamp be upset the valve automatically closes to prevent the contents of the tank from spilling. In order to secure this result, this automatic valve comprises a ball weight, from which depends a stem carrying a conical or other valve, which normally is held away from its port by the weight, the latter being sustained above the port and upon the projection from the diaphragm or plate 19, of such character as to permit the air to reach the port or opening in the plate. The weight operates to close or permit the valve to close in case of upset.

Safety devices for automatically closing the feed-valve in case of accidental upsetting of the lamp may be also provided. These prevent water from reaching the carbid. Said devices comprise a weight 21, normally sustained on a shelf or bracket 22 and connected loosely by a chain or cord with the float or some attached part. In case of accidental upsetting the ball falls from its shelf or support and its weight is sustained by the float, so that the latter is held down and the valve is kept closed.

The pivoted lever or arm 16, to which the float is attached, serves also to keep the float centered or in position, and thereby prevent it from rubbing against any neighboring parts. By this means friction is avoided and prompt and regular action of the valves is secured.

The general operation of the lamp would be as follows: A proper amount of liquid having been introduced into the font 1, the float 6 will be raised by the liquid within the gas-bell when the parts are inserted, thus opening the valve governing the passage of carbid from the carbid-chamber and allowing the material to feed into the water within the gas-bell or generator-chamber. Gas will then be generated and continue to be generated while the material is being continually fed until such time as the pressure within the generator-chamber lowers the level of the liquid therein sufficiently to cause the float 6 to fall and close the valve 7. When gas has been consumed, so as to lower the gas-pressure, the level of the liquid will rise within the chamber, owing to the superior weight of the exterior liquid column, and the float will rise and open the valve 7, so as to allow more carbid to feed.

As will be seen, the gas-generator-chamber float, carbid-chamber, carbid-feed regulator and burner, together with other coöperating parts, are all mounted together as one structure over the opening in the font by the neck 5 and diaphragm or plate 19, so that they may all be readily removed together, leaving the font clear of any obstructions that would interfere with the ready cleaning of the same.

What I claim as my invention is—

1. The combination of a carbid-chamber having a conical lower end, a tunnel fitting around said chamber and connecting with the gas-generating chamber, a pair of perforated rings fitting the annular space between the carbid-chamber and the tunnel, filtering material interposed between said rings, and a gas-pipe connected with the space above the pair of rings and leading through the carbid-chamber to a gas-burner.

2. The combination with a carbid-lamp, of a valve controlling the egress of carbid from said chamber, an operating-float sustained in the liquid of the gas-generator chamber, and a centering-lever pivoted on a fixed support and connected with the float, as and for the purpose described.

3. In an acetylene-gas lamp, the combination substantially as described, of a font and gas-generating chamber, a carbid-chamber and connecting-tube, said carbid-chamber, generating-chamber and tube being all secured together, and separable from the body or font, a burner surmounting the carbid-chamber, gas-tube extending through said chamber and connected with the tube, a float within the generator-chamber, a valve closing and opening at the lower end of the carbid-chamber, and a connecting-rod extending through the tube from the valve to the float, as and for the purpose described.

4. In an acetylene-gas lamp, the combination with a water-containing font, of a carbid-chamber, a gas-generator, a tube or tunnel attached to the carbid-chamber and to said generator, a carbid-feed valve, a float, a rod by which the float is attached to said feed-valve, and a burner mounted on the carbid-chamber and connecting with the tunnel by a pipe passing through said chamber, said parts constituting a unitary structure, removable as a whole from the font, as and for the purpose described.

5. The combination in an acetylene-gas lamp, of a carbid-chamber, a valve at the lower end thereof, a gas-generating chamber, a float connected with the valve, a rod passing down through the carbid-chamber and connected with the float, and means for locking said rod in position to keep the valve closed.

6. In an acetylene-gas lamp, the combination with a generator feed-valve, of a weight-sustaining shelf or support, and a weight connected to said valve, but normally sustained upon said shelf or support so as to be out of action and adapted when the lamp is upset to keep said valve closed.

Signed at Baltimore, in the State of Maryland, this 29th day of September, A. D. 1902.

WILLIAM OTTERBEIN NELSON.

Witnesses:
K. DICKENS,
A. CAMPBELL.